Patented Jan. 7, 1936

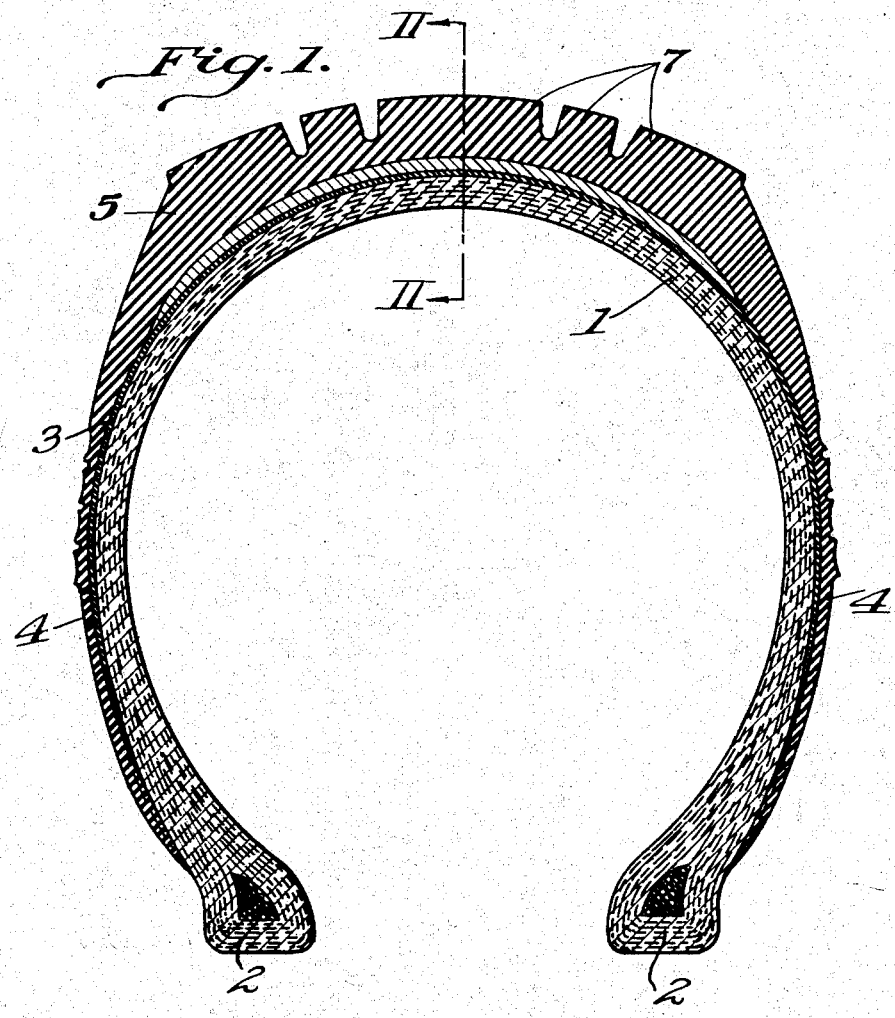
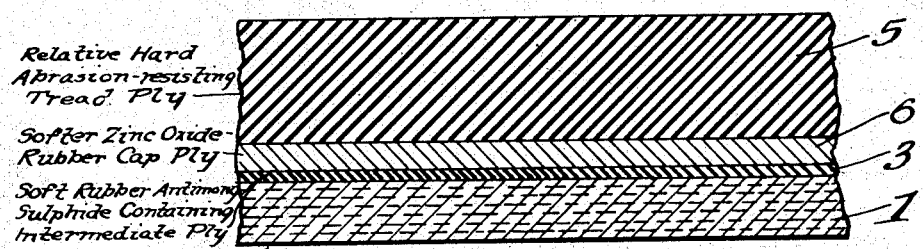

2,027,248

UNITED STATES PATENT OFFICE 2,027,248

PNEUMATIC TIRE CASING

Ralph M. Reel, Newark, Ohio, assignor to The Pharis Tire and Rubber Company, Newark, Ohio, a corporation of Ohio Application August 7, 1933, Serial No. 684,091

2 Claims. (Cl. 152—13)

This invention relates to improvements in the construction of pneumatic vehicle tires, and has particular reference to tires of the type embodying a fabric or cord carcass, intermediate plies of graded soft rubber and an outer tread ply of a relatively hard abrasion-resisting rubber. It is a primary object of the invention to provide an improved tire of this character wherein the relatively soft rubber intermediate plies of the tire casing are so disposed that the shocks, flexures and strains set up in the tire when in use will be effectively absorbed by said intermediate plies to the end of minimizing internal temperatures, to distribute the stresses and strains in such manner as to prolong the life of the tire and to avoid the presence of conditions which result in tire failures such as blow-outs and other forms of premature tire deterioration.

Another object of the invention resides in the provision of a tire of the character above indicated in which the outer tread ply composed of a relatively hard abrasion-resisting rubber is spaced from the cord carcass of the tire by an intermediate ply of soft rubber containing antimony sulphide extending from bead to bead of the tire. This intermediate ply is of such form that it functions as a cushion between the tread ply and the cord plies and possesses a low modulus (ratio of stress to strain) which permits it to give under very low stresses so that it permits the tread and side walls to work back and forth as the tire flexes without transmitting the resulting push and pull to the carcass. The arrangement and composition of said intermediate ply tends to minimize the generation of heat within the tire casing and affords a better and more permanent union between the tread and carcass than is afforded in tires of standard manufacture.

It is a further object of the invention to employ a cushion between the intermediate ply and the tire tread, the said cushion being composed of a rubber compound relatively softer than that from which the tread is formed but somewhat harder than the antimony-containing intermediate ply. The composition of the cushion layer is such that it is more resilient than the tread, has a lower modulus and will not develop heat as readily when flexed as will the tread, the said cushion layer serving to absorb the thrusts of the tread projections, and also to maintain the tire at safe temperatures when in operation.

For a more complete understanding of the invention, reference is to be had to the following description and the accompanying drawing, wherein has been illustrated the preferred form of my present invention. In said drawing:

Fig. 1 is a vertical transverse sectional view taken through a portion of a tire constructed in accordance with the present invention;

Fig. 2 is an enlarged vertical sectional view on the line II—II of Fig. 1.

In order to insure a clear and active understanding of my invention, a tire is shown in the accompanying drawing comprising a fabric carcass 1, which is formed in the usual manner by superimposing layers of treated cords or fabric, which are worked in the usual manner about the bead portions 2. A relatively soft layer of rubber or rubber compound 3 is disposed upon the fabric carcass to extend from bead to bead. The layer 3 is relatively thin in cross section and is adapted to separate the outer side walls 4 of the tread layer 5 from the carcass. Also a cushion layer 6 of a relatively soft rubber compound is arranged between the tread proper of the tire and the relatively softer rubber intermediate layer 3 to assist in the absorption of substantially vertically directed thrusts or compression strains. The cushion 6 is also relatively thin in cross section, as compared with the outer tread layer of the tire, but is only of sufficient length to register with the outer thickened tread regions of the layer 5 and not to any material extent with the side walls 4.

It is necessary that the outer portion or tread stock 5 of the tire be of relatively hard rubber in order to withstand the severe wear incident to its engagement with road surfaces. This stock is provided with the usual traction projections or buttons 7. The intermediate layer 3, which is vulcanized to the carcass 1, is composed of a compound by which the advantages above set forth are obtainable. The layer 3 must be relatively soft and resilient, in order to cushion the inward movement of the tread layer and to provide for sufficient flexibility to minimize normal temperatures.

In attaining this end, the layer 3 is composed of a rubber compound which is softer and more resilient than that employed in what may be termed the cushion cap 6, that is, the intermediate layer has a lower modulus (ratio of stress to strain) than the cushion cap 6. It contains approximately 10 parts of zinc oxide and 5 parts of antimony sulphide, preferably trisulphide, to 100 parts by weight of rubber. This intermediate layer will generate very little heat when flexed. Its low modulus permits it to yield under very low stresses so that it permits the tread and side walls to work back and forth as the tire flexes without transmitting the resulting push and pull to the carcass. This attribute of the intermediate layer tends to keep down the development of heat and results in a better and more permanent union between the tread and carcass. By extending the intermediate layer to the bead, the side walls of the tire casing are likewise protected in the same manner as has been set forth in reference to the tread proper. The intermediate layer, therefore, contributes to minimize those tire troubles known as curb bruises, similar to a stone bruise under the tread, but occurring in the side wall, and which are usually caused by striking the tire against a curb at an angle when parking.

The cap cushion is composed of zinc stock, well known to tire manufacturers, and contains approximately 44 parts of zinc oxide to 100 parts of rubber. As stated, this cushion is more resilient than the tread, has a lower modulus, will not heat when flexed as rapidly as will the tread, and is also a better conductor of heat. I am aware of the fact that it has been proposed heretofore to utilize in tire manufacture an inner layer or ply composed of a relatively soft rubber having substantially the above described composition of the cushion 6 but so far as I am aware such a layer has not, prior to my present invention, been outlined in conjunction with a softer inner cushion containing antimony sulphide.

The tread stock may be of standard composition, in that it contains approximately 42 parts by weight of carbon black per 100 parts of rubber. This stock has all of the usual properties such as abrasion resistance, stiffness and other wear resisting qualities.

By virtue of this construction, arrangement and composition of rubber plies around the cord carcass of a tire, the latter possesses unusually high resistance to those forces, encountered in tire operation which tend to produce premature deterioration of the tire over usual tread wear. The construction of the tire is such as to avoid particularly tire failures falling under the term of "blow-outs", which are attributable in the main to the weakening of the tire carcass by excessive internal temperatures and the development of an imperfect union between the tread and carcass.

It will be understood that the proportions of the materials above specified may be varied somewhat without departing from the underlying spirit and scope of the invention. Also the rubber plies may contain the usual vulcanizing agents, accelerators and antioxidants as is customary in tire manufacture.

What is claimed is:

1. A pneumatic tire comprising a fabric carcass and a compound outer covering of rubber, said outer covering being composed of an outer tread and side wall layer of relatively hard high abrasive-resisting properties, an intermediate cap layer of a more resilient composition than the tread layer, and an inner layer adjacent said cap layer and of a softer and more resilient composition than the cap layer, the said inner layer containing antimony sulphide, rubber and zinc oxide, said intermediate cap layer containing approximately 44 parts by weight of zinc oxide per 100 parts of rubber and being relatively thin in cross-section as compared to the outer tread.

2. A pneumatic tire comprising a fabric carcass and a compound outer covering of rubber, said outer covering being composed of an outer tread and side wall layer of relatively hard high abrasive-resisting properties, an intermediate cap layer of a more resilient composition than the tread layer, and an inner layer adjacent said cap layer and of a softer and more resilient composition than the cap layer, the said inner layer containing antimony sulphide, rubber and zinc oxide, said intermediate cap layer containing approximately 44 parts by weight of zinc oxide per 100 parts of rubber, and said inner layer containing approximately 10 parts by weight of zinc oxide per 100 parts of rubber.

RALPH M. REEL.